United States Patent
Shimura et al.

(10) Patent No.: US 11,193,033 B2
(45) Date of Patent: Dec. 7, 2021

(54) OIL-BASED INKJET INK

(71) Applicant: RISO KAGAKU CORPORATION, Tokyo (JP)

(72) Inventors: Shinichiro Shimura, Ibaraki (JP);
Toshihiro Endo, Ibaraki (JP);
Kazuyuki Ando, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 876 days.

(21) Appl. No.: 15/965,360

(22) Filed: Apr. 27, 2018

(65) Prior Publication Data
US 2018/0340088 A1 Nov. 29, 2018

(30) Foreign Application Priority Data
May 24, 2017 (JP) .............................. JP2017-102374

(51) Int. Cl.
*C09D 11/00* (2014.01)
*C09D 11/38* (2014.01)
*C09D 11/322* (2014.01)
*C09D 11/36* (2014.01)
*C09D 1/00* (2006.01)
*C09D 4/00* (2006.01)
*C09D 5/00* (2006.01)
*C09K 3/00* (2006.01)

(52) U.S. Cl.
CPC ............ *C09D 11/38* (2013.01); *C09D 11/322* (2013.01); *C09D 11/36* (2013.01)

(58) Field of Classification Search
USPC .................................. 106/31.01, 31.13, 31.6
See application file for complete search history.

(56) References Cited

U.S. PATENT DOCUMENTS

| 5,354,368 | A | * | 10/1994 | Larson, Jr. | ............. | C09D 11/34 |
| | | | | | | 106/31.3 |
| 5,876,492 | A | | 3/1999 | Malhotra et al. | | |
| 2012/0207983 | A1 | * | 8/2012 | Matsuyama | ............ | C09D 11/40 |
| | | | | | | 428/195.1 |
| 2013/0010040 | A1 | | 1/2013 | Sekiguchi et al. | | |
| 2014/0063149 | A1 | * | 3/2014 | Sato | ....................... | C09D 11/101 |
| | | | | | | 347/86 |
| 2016/0060472 | A1 | * | 3/2016 | Takahashi | ............. | C09D 133/08 |
| | | | | | | 522/18 |
| 2018/0340088 | A1 | * | 11/2018 | Shimura | .............. | C09D 11/322 |

FOREIGN PATENT DOCUMENTS

| EP | 3357980 A1 | 8/2018 |
| JP | 2005-290035 | 10/2005 |
| JP | 2007-137924 A | 6/2007 |
| JP | 2007-291253 | 11/2007 |
| JP | 2010-191244 | 9/2010 |
| JP | 2010-191245 A | 9/2010 |
| JP | 2010-237616 A | 10/2010 |
| JP | 2011-225714 | 11/2011 |
| JP | 2015-028098 | 2/2015 |
| WO | 2011/122062 | 10/2011 |

OTHER PUBLICATIONS

Office Action issued in European patent application No. 18 168 999.3, dated Nov. 28, 2019, 5 pages.
Office Action issued for the counterpart Japanese Patent Application No. 2017-102374, dated Oct. 13, 2020, 6 pages including machine translation.
Extended European Search Report; European Patent Application No. 18168999.3, dated Sep. 19, 2018 (7 pages).

* cited by examiner

*Primary Examiner* — James E McDonough
(74) *Attorney, Agent, or Firm* — Hamre, Schumann, Mueller & Larson, P.C.

(57) ABSTRACT

An oil-based inkjet ink can be provided that prevents adhesion of the ink to the nozzle plate, thereby preventing ink misfires and discharge defects from the inkjet nozzles. The oil-based inkjet ink contains a pigment, a non-aqueous solvent, and a compound represented by general formula (1) shown below.

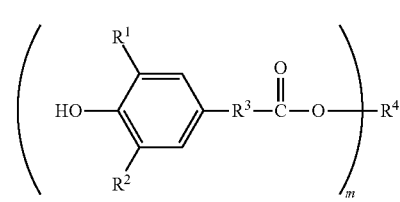

General formula (1)

(In general formula (1), m represents 1 or 2, each of $R^1$ and $R^2$ independently represents a monovalent saturated hydrocarbon group, $R^3$ represents a single bond or a divalent saturated hydrocarbon group, and $R^4$ represents a monovalent or divalent saturated hydrocarbon group.)

10 Claims, No Drawings

OIL-BASED INKJET INK

BACKGROUND OF THE INVENTION

Cross Reference to Related Applications

This Application is based upon and claims the benefit of priority from prior Japanese Patent Applications No. 2017-102374 filed on May 24, 2017, the entire contents of which are incorporated by reference herein.

Field of the Invention

The present invention relates to an oil-based inkjet ink.

Description of the Related Art

The inkjet recording method is a method in which an inkjet ink of high fluidity is jetted from fine nozzles in the form of liquid droplets, thereby recording an image on a recording medium positioned facing the nozzles, and because this method enables high-speed printing to be conducted with little noise, it has rapidly become widespread in recent years. Examples of known types of inks that can be used in this type of inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent. Non-aqueous inks can be classified into solvent-based inks in which the main solvent is a volatile organic solvent, and oil-based inks in which the main solvent is an organic solvent having either low volatility or no volatility. Solvent-based inks mainly dry on the recording medium as a result of evaporation of the organic solvent, whereas oil-based inks mainly dry as a result of penetration into the recording medium.

With an oil-based ink, when a paper is used as the recording medium, because there is minimal effect on the bonds between the pulp fibers that constitute the structural component of the paper, the printed paper is unlikely to suffer from curling or cockling, and because penetration of the ink into the paper is rapid, the apparent drying properties are excellent. Moreover, oil-based inks also offer the advantages that because the solvent is difficult to volatilize, nozzle blockages are unlikely to occur, and the frequency of head cleaning can be reduced, making the inks applicable to high-speed printing.

In an inkjet printer, the nozzle plate that includes the discharge portions from the inkjet nozzles is generally a resin product formed from a polyimide or the like. The nozzle plate is usually subjected to a fluorine coating treatment to impart the plate with ink repellency.

If the nozzle plate is readily wet by the ink, then the ink will adhere more easily to the nozzle plate, which can lead to blockages of the nozzle discharge portions, resulting in ink misfires or discharge defects.

In those cases where the ink contains a pigment dispersant as well as a pigment, adhesion of the ink to the nozzle plate is even more likely and becomes particularly problematic.

On the other hand, in oil-based inkjet inks, antioxidants are often added to prevent oxidation of the various components. Examples of these antioxidants include hindered phenol-based antioxidants.

Patent Document 1 (JP 2011-225714 A) and Patent Document 2 (WO 2011/122062 A1) disclose that in gel oil inkjet inks containing a gelling agent, a resin and a non-aqueous solvent, an antioxidant such as a hindered phenol-based compound may be added to prevent oxidative polymerization.

Patent Document 3 (JP 2015-28098 A), Patent Document 4 (JP 2007-291253 A) and Patent Document 5 (JP 2005-290035 A) disclose that an antioxidant may be added to prevent oxidation of the various components in an oil-based ink, and disclose hindered phenol-based compounds such as di-n-butylhydroxytoluene (BHT) and butylhydroxyanisole (BHA) as examples of the antioxidant.

SUMMARY OF THE INVENTION

The present invention is summarized below.

An oil-based inkjet ink containing a pigment, a non-aqueous solvent, and a compound represented by general formula (1) shown below.

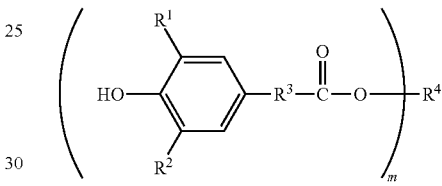

General formula (1)

(In general formula (1), m represents 1 or 2, each of $R^1$ and $R^2$ independently represents a monovalent saturated hydrocarbon group, $R^3$ represents a single bond or a divalent saturated hydrocarbon group, and $R^4$ represents a monovalent or divalent saturated hydrocarbon group.)

DETAILED DESCRIPTION OF THE EMBODIMENTS

In the inkjet recording method, it is desirable to reduce the ink wettability of the nozzle plate in order to prevent discharge faults from the inkjet nozzles. One method of lowering the ink wettability involves the selection of components having low affinity with the nozzle plate for the various components such as the pigment, pigment dispersant and non-aqueous solvent. However, because this limits the range of ink components, performance factors such as the storage stability and the image density can sometimes be restricted.

Further, in Patent Documents 1 to 5, hindered phenol-based compounds are added to the ink as typical antioxidants. Further, these antioxidants are limited to typical structures such as BHT and BHA.

An object of the present invention is to provide an oil-based inkjet ink that prevents adhesion of the ink to the nozzle plate, thereby preventing ink misfires and discharge defects from the inkjet nozzles.

The present invention is described below using embodiments. The examples presented in the following embodiments in no way limit the present invention.

An oil-based inkjet ink according to one embodiment (hereafter also referred to as simply "the ink") contains a pigment, a non-aqueous solvent, and a compound represented by general formula (1) shown below (hereafter also referred to as simply "the compound (1)").

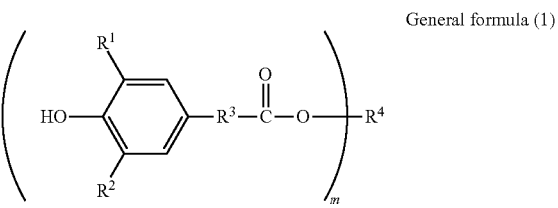

General formula (1)

In general formula (1), m represents 1 or 2, each of $R^1$ and $R^2$ independently represents a monovalent saturated hydrocarbon group, $R^3$ represents a single bond or a divalent saturated hydrocarbon group, and $R^4$ represents a monovalent or divalent saturated hydrocarbon group.

By using this embodiment, adhesion of the ink to the nozzle plate can be prevented, thereby preventing ink misfires and discharge defects from the inkjet nozzles. Further, this ink can prevent adhesion of the ink to the nozzle plate without restricting the various components such as the pigment and the non-aqueous solvent, has favorable storage stability, and can provide printed items of high image density.

In the inkjet recording method, the nozzle plate is generally composed of a substrate formed from a polyimide or the like that has been coated with an ink-repellent cured film formed from a fluororesin or the like to improve the ink repellency. Because the nozzle plate repels ink, liquid cutoff improves, and flight deflection can be prevented. Ink adherence to the nozzle plate can cause flight deflection, liquid drips and discharge faults and the like.

Alignment of the surface functional groups (such as sulfo groups and carboxyl groups) of the pigment with the nozzle plate increases the likelihood of the pigment adsorbing to the nozzle plate, resulting in ink adhesion. Further, if the pigment particles grind against the surface of the nozzle plate, causing the cured film on the nozzle plate to rub off or detach, then the substrate can become exposed, resulting in even more ink adhesion. Furthermore, wiping of the nozzle plate with a wiping blade during cleaning operations also increases the likelihood of the cured film being rubbed off, making ink adhesion even more problematic.

Moreover, in those cases where the ink contains a pigment dispersant, the functional groups (such as amino groups) of the free pigment dispersant tend to align with the nozzle plate, meaning the pigment is more likely to adsorb to the nozzle plate together with the pigment dispersant, thus increasing the problem of ink adhesion.

By including the compound (1) in the ink, the surface functional groups of the pigment and the functional groups of the free pigment dispersant are inactivated, meaning adsorption of the pigment and the pigment dispersant to the nozzle plate can be suppressed. In other words, the ink wettability of the nozzle plate can be reduced, and adhesion of the ink to the nozzle plate can be prevented.

The compound (1) is able to achieve the effects described above as a result of having a hindered phenol site and an ester linkage (—COO—). BHT, which is a representative example of a hindered phenol-based antioxidant, has a hindered phenol site, but lacks an ester linkage, and therefore has little effect in reducing the ink wettability of the nozzle plate.

Further, the compound (1) can achieve the above effects as a result of containing either one or two hindered phenol sites. Compounds having three or more hindered phenol sites are less likely to have an effect in reducing the ink wettability of the nozzle plate.

In this manner, in the present invention, the ink wettability of the nozzle plate can be reduced as a result of the compound (1) having a specific structure which includes a hindered phenol site together with an ester linkage, and in which there are either one or two hindered phenol sites.

A compound represented by general formula (1) (the compound (1)) may be added to the ink.

In general formula (1), m represents either 1 or 2.

When m=1, there is one hindered phenol ester site, and $R^4$ represents a monovalent saturated hydrocarbon group. When m=2, there are two hindered phenol ester sites, and $R^4$ represents a divalent saturated hydrocarbon group, with the two hindered phenol ester sites being linked via $R^4$. From the viewpoint of reducing the ink wettability of the nozzle plate, compounds in which m=1 are preferred.

Each of $R^1$ and $R^2$ independently represents a monovalent saturated hydrocarbon group, which may be a linear or branched chain. $R^1$ and $R^2$ may be the same or different.

The number of carbon atoms in each of $R^1$ and $R^2$ is, independently, any value of 1 or greater, and is preferably at least 3, and more preferably 4 or greater. On the other hand, the number of carbon atoms in each of $R^1$ and $R^2$ is, independently, preferably not more than 20, more preferably not more than 10, and even more preferably 6 or fewer.

Specific examples of $R^1$ and $R^2$ include alkyl groups such as a methyl group, ethyl group, propyl group, isopropyl group, n-butyl group, sec-butyl group, isobutyl group, tert-butyl group, pentyl group, hexyl group, heptyl group, octyl group, nonyl group, decyl group and eicosyl group.

Either one or both of $R^1$ and $R^2$ preferably each represent a monovalent saturated hydrocarbon group having a branch, and for example, an isopropyl group, sec-butyl group, isobutyl group or tert-butyl group is preferred, and a tert-butyl group is particularly preferred. Compounds in which $R^1$ and $R^2$ are both tert-butyl groups are particularly desirable. When the compound (1) has bulky structures such as tert-butyl groups, the steric hindrance increases, resulting in better inactivation of the surface functional groups of the pigment and the functional groups of the free pigment dispersant, and enabling better prevention of adsorption of the pigment and the pigment dispersant to the nozzle plate.

$R^3$ represents a single bond or a divalent saturated hydrocarbon group, and the divalent saturated hydrocarbon group may be a linear or branched chain.

The number of carbon atoms in $R^3$ is preferably at least 1, and more preferably 2 or greater. On the other hand, the number of carbon atoms in $R^3$ is preferably not more than 20, more preferably not more than 10, and even more preferably 6 or fewer.

Specific examples of $R^3$ include a single bond, and alkylene groups such as a methylene group, ethylene group, propylene group, isopropylene group, n-butylene group, sec-butylene group, isobutylene group, tert-butylene group, pentylene group, hexylene group, heptylene group, octylene group, nonylene group, decylene group and eicosylene group. A methylene group, ethylene group or propylene group is preferred.

$R^4$ represents a monovalent or divalent saturated hydrocarbon group, which may be a linear or branched chain.

When m=1, $R^4$ is a monovalent saturated hydrocarbon group, and when m=2, $R^4$ is a divalent saturated hydrocarbon group.

The number of carbon atoms in the monovalent or divalent saturated hydrocarbon group represented by $R^4$ is preferably at least 1 and more preferably at least 6, and may be 10 or greater. On the other hand, the number of carbon atoms in the monovalent or divalent saturated hydrocarbon group represented by $R^4$ is preferably not more than 25, and more preferably 20 or fewer.

Specific examples of the monovalent saturated hydrocarbon group represented by $R^4$ include alkyl groups such as a methyl group, ethyl group, propyl group, isopropyl group, n-butyl group, sec-butyl group, isobutyl group, tert-butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, eicosyl group and pentaeicosyl group.

Specific examples of the divalent saturated hydrocarbon group represented by $R^4$ include alkylene groups such as a methylene group, ethylene group, propylene group, isopropylene group, n-butylene group, sec-butylene group, isobutylene group, tert-butylene group, pentylene group, hexylene group, heptylene group, octylene group, nonylene group, decylene group, undecylene group, dodecylene group, tridecylene group, tetradecylene group, pentadecylene group, hexadecylene group, heptadecylene group, octadecylene group, nonadecylene group, eicosylene group and pentaeicosylene group.

Among these groups, $R^4$ is preferably a linear monovalent or divalent saturated hydrocarbon group having at least 6 carbon atoms.

In one example, it is preferable to use a compound of general formula (1) in which m represents 1, $R^3$ is a divalent saturated hydrocarbon group, and $R^4$ is a monovalent saturated hydrocarbon group.

In another example, it is preferable to use a compound of general formula (1) in which m represents 1, $R^1$ and $R^2$ are tert-butyl groups, $R^3$ is a divalent saturated hydrocarbon group, and $R^4$ is a monovalent saturated hydrocarbon group having at least 6 carbon atoms.

These compounds can further reduce the ink wettability of the nozzle plate, and can therefore effectively prevent ink adhesion to the nozzle plate.

Examples of preferred compounds of the compound (1) are compounds represented by general formula (2) shown below.

General formula (2)

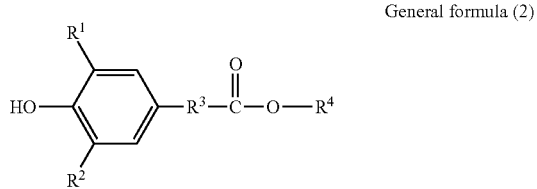

Examples of even more preferred compounds of the compound (1) are compounds represented by general formula (3) shown below.

General formula (3)

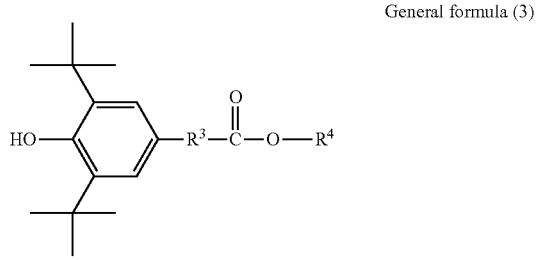

In general formula (2) and general formula (3), $R^1$, $R^2$, $R^3$ and $R^4$ are as described above.

Specific examples of the compound (1) include octadecyl 3-(3,5-di-t-butyl-4-hydroxyphenyl)-propionate ("IRGANOX 1076", "KEMIMOX 76" manufactured by Chemipro Kasei Kaisha, Ltd., and "ADK STAB AO-50" and "ADK STAB AO-50F" manufactured by Adeka Corporation); octyl 3-(3',5'-di-t-butyl-4'-hydroxyphenyl)propionate ("IRGANOX 1135"); 1,6-hexanediol bis[3-(3,5-di-tert-butyl-4-hydroxyphenyl)propionate] ("IRGANOX 259"); and hexadecyl 3',5'-di-t-butyl-4'-hydroxybenzoate ("KEMISORB 114" manufactured by Chemipro Kasei Kaisha, Ltd., and "CYASORB UV-2908" manufactured by Sun Chemical Co., Ltd.). The names in the parentheses are product names, with the IRGANOX series of products available from BASF Corporation.

Although dependent on the nature of the compound (1) and the usage environment, the amount used of the compound (1) relative to the total mass of the ink is preferably at least 0.01% by mass, more preferably at least 0.05% by mass, and even more preferably 0.1% by mass or greater. This enables the ink wettability of the nozzle plate to be reduced, and can prevent adhesion of the ink to the nozzle plate.

Although there are no particular restrictions on the amount of the compound (1), from the viewpoint of the inkjet discharge performance, the amount of the compound (1) relative to the total mass of the ink is preferably not more than 10% by mass, more preferably not more than 3% by mass, and even more preferably 1% by mass or less.

Examples of pigments that may be used in the ink include organic pigments such as azo pigments, phthalocyanine pigments, polycyclic pigments and dye lake pigments, and inorganic pigments such as carbon blacks and metal oxides. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. These pigments may be used individually, or a combination of two or more pigments may be used.

From the viewpoints of the discharge stability and storage stability, the average particle size of the pigment is preferably not more than 300 nm, and more preferably 200 nm or less.

The amount of the pigment, relative to the total mass of the ink, is preferably from 0.1 to 20% by mass, more preferably from 1 to 15% by mass, and even more preferably from 2 to 10% by mass. This enables appropriate coloring to be achieved for the ink, and enables the ink storage stability to be maintained.

A pigment dispersant may be added to the ink to enhance the dispersion stability of the pigment.

Examples of the pigment dispersant include hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, copolymers of vinylpyrrolidone and long-chain alkenes, modified polyurethanes, modified polyacrylates, polyether ester anionic surfactants, polyoxyethylene alkyl phosphate esters, and polyester polyamines. Among these, the use of a polymeric dispersant is preferred.

Examples of commercially available pigment dispersants include Antaron V216 (a vinylpyrrolidone-hexadecene copolymer) (a product name), manufactured by ISP Japan Ltd.; Solsperse 13940 (a polyester amine-based dispersant), 16000, 17000 and 18000 (fatty acid amine-based dispersants), and 11200, 24000 and 28000 (all product names), manufactured by The Lubrizol Corporation; Efka 400, 401, 402, 403, 450, 451 and 453 (modified polyacrylates) and Efka 46, 47, 48, 49, 4010 and 4055 (modified polyurethanes) (all product names), manufactured by Efka Chemicals B.V.; DISPARLON KS-860 and KS-873N4 (polymeric polyester amine salts) (both product names), manufactured by Kusumoto Chemicals, Ltd.; DISCOL 202, 206, OA-202 and OA-600 (multi-chain polymeric nonionic dispersants) (all product names), manufactured by DKS Co., Ltd.; DISPERBYK 2155 and 9077 (both product names). manufactured by BYK-Chemie Japan K.K.; and Hypermer KD2, KD3, KD11 and KD12 (all product names), manufactured by Croda Japan K.K.

The amount of the pigment dispersant need only be sufficient to enable satisfactory dispersion of the pigment within the ink, and may be set as appropriate. For example, the pigment dispersant is typically added in a mass ratio within a range from 0.1 to 5 relative to a value of 1 for the pigment. Further, the pigment dispersant is typically added in an amount of 0.1 to 10% by mass relative to the total mass of the ink.

Among the various pigment dispersants, an amine-based pigment dispersant is ideal for a carbon black. This is because amine-based pigment dispersants have a high affinity for the surface functional groups of carbon blacks. On the other hand, because amine-based pigment dispersants have amino groups, they tend to adsorb readily to the nozzle plate. In one embodiment, by adding the compound (1) to the ink, the amino groups of any excess pigment dispersant can be inactivated. As a result, the storage stability and the image density of the printed items can be improved, and adhesion of the ink to the nozzle plate can be prevented.

Both non-polar organic solvents and polar organic solvents can be used as the non-aqueous solvent. In one embodiment, a water-insoluble organic solvent that does not mix uniformly with an equal volume of water at 1 atmosphere and 20° C. is preferably used as the non-aqueous solvent.

Examples of preferred non-polar organic solvents include petroleum-based hydrocarbon solvents such as aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based, isoparaffin-based, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JXTG Nippon Oil & Energy Corporation); Isopar G, Isopar H, Isopar L, Isopar M, Exxsol D40, Exxsol D60, Exxsol D80, Exxsol D95, Exxsol D110 and Exxsol D130 (all manufactured by JXTG Nippon Oil & Energy Corporation); and MORESCO White P-40, MORESCO White P-60, MORESCO White P-70, MORESCO White P-80, MORESCO White P-100, MORESCO White P-120, MORESCO White P-150, MORESCO White P-200, MORESCO White P-260 and MORESCO White P-350P (all manufactured by MORESCO Corporation).

Examples of preferred aromatic hydrocarbon solvents include Grade Alkene L and Grade Alkene 200P (both manufactured by JXTG Nippon Oil & Energy Corporation), and Solvesso 100, Solvesso 150, Solvesso 200 and Solvesso 200ND (manufactured by JXTG Nippon Oil & Energy Corporation).

The initial boiling point of the petroleum-based hydrocarbon solvent is preferably at least 100° C., more preferably at least 150° C., and even more preferably 200° C. or higher. The initial boiling point can be measured in accordance with JIS K0066 "Test Methods for Distillation of Chemical Products".

Examples of polar organic solvents that can be used favorably include fatty acid ester-based solvents, higher alcohol-based solvents and higher fatty acid-based solvents.

Specific examples include fatty acid ester-based solvents having at least 13 carbon atoms, and preferably 16 to 30 carbon atoms, within one molecule, such as isononyl isononanoate, isodecyl isononanoate, methyl laurate, isopropyl laurate, hexyl laurate, isopropyl myristate, isopropyl palmitate, hexyl palmitate, isooctyl palmitate, isostearyl palmitate, methyl oleate, ethyl oleate, isopropyl oleate, butyl oleate, hexyl oleate, methyl linoleate, ethyl linoleate, isobutyl linoleate, butyl stearate, hexyl stearate, isooctyl stearate, isopropyl isostearate, 2-octyldecyl pivalate, methyl soybean oil, isobutyl soybean oil, methyl tallate and isobutyl tallate;

higher alcohol-based solvents having at least 6 carbon atoms, and preferably 12 to 20 carbon atoms, within one molecule, such as isomyristyl alcohol, isopalmityl alcohol, isostearyl alcohol, 1-octadecanol, oleyl alcohol, isoeicosyl alcohol and decyltetradecanol; and higher fatty acid-based solvents having at least 12 carbon atoms, and preferably 14 to 20 carbon atoms, within one molecule, such as lauric acid, isomyristic acid, palmitic acid, isopalmitic acid, α-linolenic acid, linoleic acid, oleic acid and isostearic acid.

The boiling point of these polar organic solvents such as fatty acid ester-based solvents, higher alcohol-based solvents and higher fatty acid-based solvents is preferably at least 150° C., more preferably at least 200° C., and even more preferably 250° C. or higher. These non-aqueous solvents having a boiling point of 250° C. or higher also include non-aqueous solvents that do not exhibit an actual boiling point.

These non-aqueous solvents may be used individually, or a combination of two or more solvents may be used, provided the solvents form a single phase. Further, other organic solvents may also be added, provided they do not impair the solubility of the compound (1), and provided they can form a single phase with the non-aqueous solvent being used.

In addition to the various components described above, the oil-based ink may also include various additives, provided these additives do not impair the effects of the present invention. For example, additives such as nozzle blockage inhibitors, antioxidants, conductivity modifiers, viscosity modifiers, surface tension regulators, and oxygen absorbers and the like may be added as appropriate. There are no particular limitations on the types of these additives, and materials typically used in this technical field may be used.

The ideal range for the viscosity of the oil-based inkjet ink varies depending on factors such as the diameter of the nozzles within the discharge head of the inkjet recording system and the discharge environment, but generally, the viscosity at 23° C. is preferably within a range from 5 to 30 mPa·s, and more preferably from 5 to 15 mPa·s.

The ink can be produced by mixing the various components including the pigment, the non-aqueous solvent and the compound (1), together with any optional components such as a pigment dispersant. The ink is preferably produced by mixing and stirring the components together, either in a single batch or in a number of separate batches. Specifically, the ink can be produced by dispersing all of the components in a dispersion device such as a beads mill, either in a single batch or in a number of separate batches, and then, if desired, passing the resulting dispersion through a filtration device such as a membrane filter.

There are no particular limitations on the printing method used with the inkjet ink, and any of various printing systems, including a piezo system, electrostatic system or thermal system may be used. In those cases where an inkjet recording device is used, the ink according to an embodiment is preferably discharged from the inkjet head based on a digital signal, with the discharged ink droplets being adhered to a recording medium.

In one embodiment, there are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface. Among these, from the viewpoint of ink penetration, a printing paper such as a plain paper or a coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several μm to several tens of μm are formed with a spacing between fibers of several tens to several hundred μm, and therefore the ink can penetrate readily.

Further, in terms of coated papers, coated papers designed for inkjets, such as matte papers, glossy papers and semi-glossy papers, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like.

Examples

The present invention is described below in further detail using a series of examples. However, the present invention is in no way limited by the following examples.

<Ink Production>

Table 1 and Table 2 show the formulations and evaluation results for inks of a series of examples and comparative examples.

The various components were mixed in accordance with each of the formulations shown in each table, and in each case, the resulting mixture was then dispersed for about 20 minutes in a beads mill to obtain an ink.

In Comparative Example 1, the compound (1) was not used. In Comparative Examples 2 to 6, comparative compounds were used.

The compounds shown in each of the tables were as follows.

Carbon black: "MA8" manufactured by Mitsubishi Chemical Corporation.

Phthalocyanine blue: "Chromofine 4927" manufactured by Dainichiseika Color & Chemicals Mfg. Co., Ltd.

Solsperse 13940: "Solsperse 13940", a polyester amine-based pigment dispersant, manufactured by The Lubrizol Corporation.

Efka 450: "Efka 450", a modified polyacrylate-based pigment dispersant, manufactured by Efka Chemicals B.V.

Butyl oleate: a fatty acid ester-based solvent, manufactured by Junsei Chemical Co., Ltd.

Exxsol D-130: a petroleum-based hydrocarbon solvent, manufactured by JXTG Nippon Oil & Energy Corporation.

Details relating to the various forms of the compound (1) and the comparative compounds are shown in Table 3. The chemical structures of the compound (1) and the comparative compounds are shown in Table 4.

<Evaluation Method>

Using each of the inks obtained in the manner described above, an evaluation of the ink wettability of the nozzle plate was conducted. The results are shown in Tables 1 and 2.

Each ink was placed in a sealable container, an inkjet head nozzle plate (formed from a polyimide) was immersed in the ink, and the container was then sealed and stored for 4 weeks in an environment at 50° C. Subsequently, the nozzle plate was pulled slowly out of the ink, the state of adhesion of the ink to the surface of the nozzle plate was observed, and an evaluation was performed against the following criteria.

S: the ink forms liquid droplets and is repelled.

A: a few locations exist in which the ink is not repelled.

B: locations in which the ink is repelled and locations in which the ink is not repelled are of similar size.

C: few locations exist in which the ink is repelled, and the nozzle plate remains wet with the ink.

TABLE 1

Ink formulations and evaluation results

| Units: % by mass | | m | $R^1$/$R^2$ | Number of C atoms in $R^3$ | Number of C atoms in $R^4$ | Example 1 | 2 | 3 | 4 | 5 | 6 | 7 | 8 | 9 | 10 |
|---|---|---|---|---|---|---|---|---|---|---|---|---|---|---|---|
| Pigment | Carbon black | | | | | 5 | 5 | 5 | 5 | 5 | 5 | 5 | 5 | 5 | — |
| | Phthalocyanine blue | | | | | — | — | — | — | — | — | — | — | — | 5 |
| Dispersant | Solsperse 13940 | | | | | 5 | 5 | 5 | 5 | 5 | 5 | 5 | 5 | 5 | — |
| | Efka 450 | | | | | — | — | — | — | — | — | — | — | — | 5 |
| Compound (1) | IRGANOX 1076 | 1 | t-Bu/t-Bu | 2 | 18 | 0.05 | 0.1 | 0.5 | — | — | — | 0.1 | 0.1 | 0.1 | 0.1 |
| | IRGANOX 1135 | 1 | t-Bu/t-Bu | 2 | 8 | — | — | — | 0.1 | — | — | — | — | — | — |
| | IRGANOX 259 | 2 | t-Bu/t-Bu | 2 | 6 | — | — | — | — | 0.1 | — | — | — | — | — |
| | KEMISORB 114 | 1 | t-Bu/t-Bu | 0 | 16 | — | — | — | — | — | 0.1 | — | — | — | — |
| Solvent | Butyl oleate | | | | | 49.95 | 49.9 | 49.5 | 49.9 | 49.9 | 49.9 | 49.9 | 89.9 | — | 49.9 |
| | Exxsol D-130 | | | | | 40 | 40 | 40 | 40 | 40 | 40 | 40 | — | 89.9 | 40 |
| Total (% by mass) | | | | | | 100 | 100 | 100 | 100 | 100 | 100 | 100 | 100 | 100 | 100 |
| Ink wettability of nozzle plate | | | | | | S | S | S | S | A | A | S | S | S | S | t-Bu: tert-butyl

TABLE 2

Ink formulations and evaluation results

| Units: % by mass | | m | $R^1$/$R^2$ | Number of C atoms in $R^3$ | Number of C atoms in $R^4$ | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Pigment | Carbon black | | | | | 5 | 5 | 5 | 5 | 5 | 5 |
| | Phthalocyanine blue | | | | | — | — | — | — | — | — |
| Dispersant | Solsperse 13940 | | | | | 5 | 5 | 5 | 5 | 5 | 5 |
| | Efka 450 | | | | | — | — | — | — | — | — |
| Comparative compound | IRGANOX 1010 | 4 | t-Bu/t-Bu | 2 | 5 | — | 0.1 | — | — | — | — |
| | IRGANOX 1098 | 2 | t-Bu/t-Bu | (2)* | (6)* | — | — | 0.1 | — | — | — |
| | BHT | 0 | t-Bu/t-Bu | — | — | — | — | — | 0.1 | — | — |
| | IRGANOX 1330 | 0 | t-Bu/t-Bu | — | — | — | — | — | — | 0.1 | — |
| | KEMINOX 9425 | 0 | t-Bu/t-BuPh | — | — | — | — | — | — | — | 0.1 |
| Solvent | Butyl oleate | | | | | 50 | 49.9 | 49.9 | 49.9 | 49.9 | 49.9 |
| | Exxsol D-130 | | | | | 40 | 40 | 40 | 40 | 40 | 40 |
| Total (% by mass) | | | | | | 100 | 100 | 100 | 100 | 100 | 100 |
| Ink wettability of nozzle plate | | | | | | C | C | C | B | C | C | t-Bu: tert-butyl,
t-BuPh: tert-butylphenol
*In general formula (1), $R^3$—COO—$R^4$ is replaced with $R^3$—CONH—$R^4$

TABLE 3

Details of the compound (1) and comparative compounds

| Product name, Manufacturer, Compound name | m | $R^1$ | $R^2$ | $R^{37}$ number of C atoms | $R^{47}$ number of C atoms |
|---|---|---|---|---|---|
| IRGANOX 1076, manufactured by BASF Corporation, octadecyl 3-(3,5-di-t-butyl-4-hydroxyphenyl)-propionate | 1 | t-Bu | t-Bu | ethylene —$C_2H_4$—/ C2 | octadecyl $C_{18}H_{37}$/ C18 |
| IRGANOX 1135, manufactured by BASF Corporation, octyl 3-(3',5'-di-t-butyl-4'-hydroxyphenyl)propionate | 1 | t-Bu | t-Bu | ethylene —$C_2H_4$—/ C2 | octyl $C_8H_{17}$/ C8 |

TABLE 3-continued

Details of the compound (1) and comparative compounds

| Product name, Manufacturer, Compound name | m | $R^1$ | $R^2$ | $R^{37}$ number of C atoms | $R^{47}$ number of C atoms |
|---|---|---|---|---|---|
| IRGANOX 259, manufactured by BASF Corporation, 1,6-hexanediol bis[3-(3,5-di-tert-butyl-4-hydroxyphenyl)propionate] | 2 | t-Bu | t-Bu | ethylene —$C_2H_4$— C2 | hexylene —$(CH_2)_6$—/ C6 |
| KEMISORB 114, manufactured by Chemipro Kasei Kaisha, Ltd. hexadecyl 3',5'-di-t-butyl-4'-hydroxybenzoate | 1 | t-Bu | t-Bu | single bond/ C0 | hexadecyl $C_{16}H_{33}$/ C16 |
| IRGANOX 1010, manufactured by BASF Corporation, pentaerythritol tetrakis(3-(3,5-di-t-butyl-4-hydroxyphenyl)propionate | 4 | t-Bu | t-Bu | ethylene —$C_2H_4$—/ C2 | tetravalent hydrocarbon group $C(CH_2-)_4$/ C5 |
| IRGANOX 1098, manufactured by BASF Corporation, N,N'-hexamethylene bis[3-(3,5-di-tert-butyl-4-hydroxyphenyl)propanamide] | 2 | t-Bu | t-Bu | ethylene —$C_2H_4$—/ (C2)* | hexylene —$(CH_2)_6$—/ (C6)* |
| BHT, manufactured by Tokyo Chemical Industry Co., Ltd. 2,6-di-tert-butyl-p-cresol | 0 | t-Bu | t-Bu | — | — |
| IRGANOX 1330, manufactured by BASF Corporation, 2,4,6-tris(3',5'-di-tert-butyl-4'-hydroxybenzyl)mesitylene | 0 | t-Bu | t-Bu | — | — |
| KEMINOX 9425, manufactured by Chemipro Kasei Kaisha, Ltd. 2,2'-methylene bis(4-ethyl-6-t-butylphenol) | 0 | t-Bu | t-BuPh | — | — | t-Bu: tert-butyl,
t-BuPh: tert-butylphenol
*In general formula (1), $R^3$—COO—$R^4$ is replaced with $R^3$—CONH—$R^4$

TABLE 4

Chemical structures of the compound (1) and comparative structures

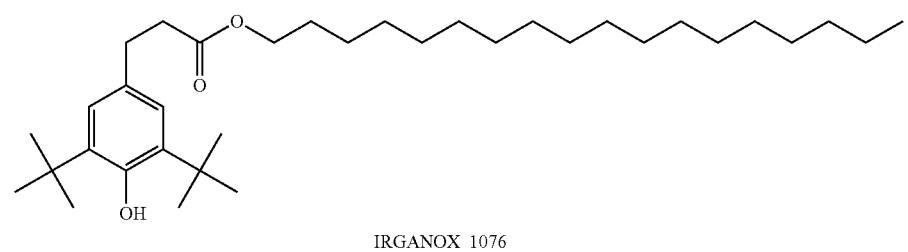 [SMILES: CCCCCCCCCCCCCCCCCCOC(=O)CCc1cc(C(C)(C)C)c(O)c(C(C)(C)C)c1]

IRGANOX 1076

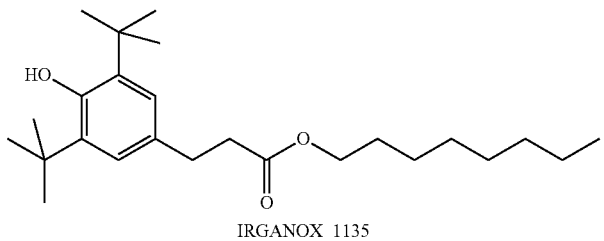 [SMILES: CCCCCCCCOC(=O)CCc1cc(C(C)(C)C)c(O)c(C(C)(C)C)c1]

IRGANOX 1135

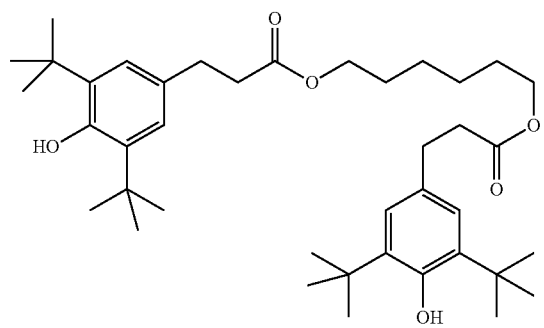

IRGANOX 259

TABLE 4-continued
Chemical structures of the compound (1) and comparative structures
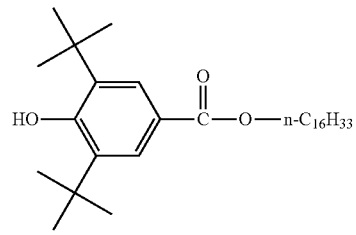
KEMISORB 114
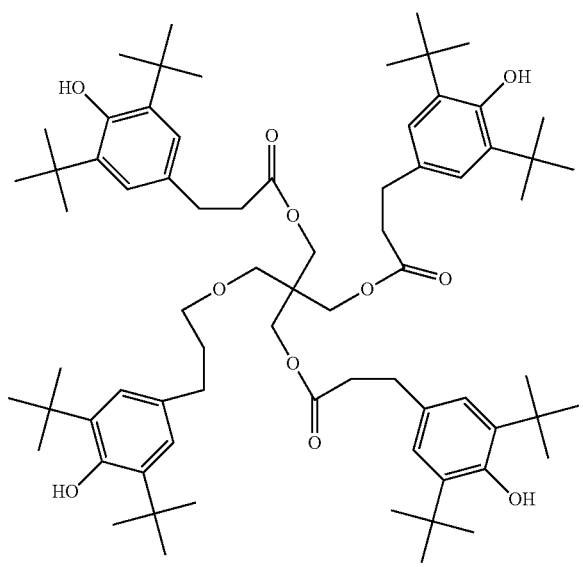
IRGANOX 1010
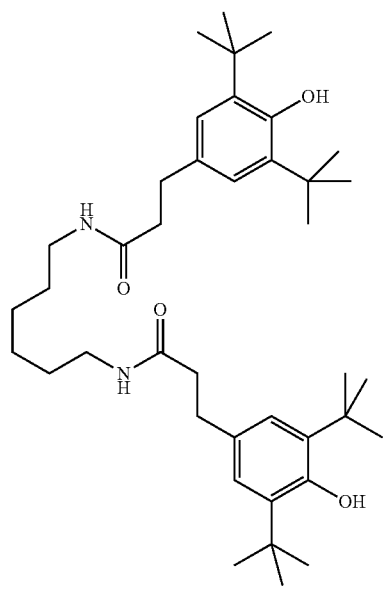
IRGANOX 1098

TABLE 4-continued

Chemical structures of the compound (1) and comparative structures

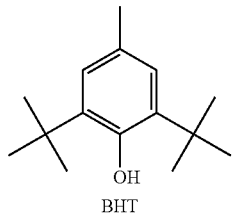

BHT

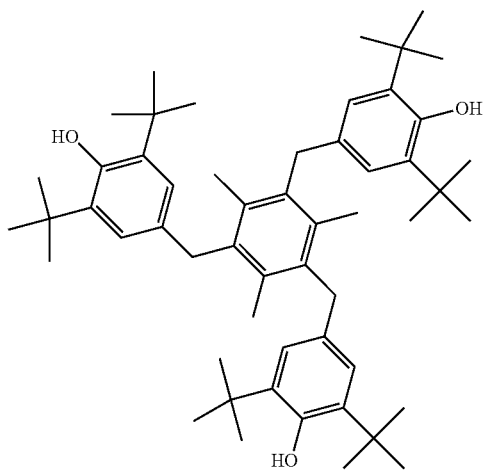

IRGANOX 1330

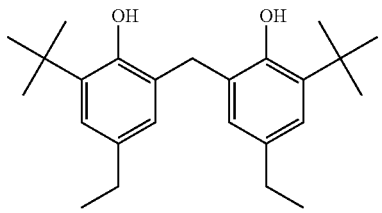

KEMINOX 9425
Molecular weight 368.6

As shown in the tables, the inks of the examples each exhibited a favorable evaluation result for the ink wettability of the nozzle plate. Further, the inks of the examples each had a viscosity suitable for inkjet discharge, and yielded favorable image density for the printed items.

In each of Examples 1 to 4, a compound (1) was used in which m=1 and $R^3$ had two carbon atoms, and the ink wettability of the nozzle plate was able to be further reduced.

In Example 5, a compound (1) was used in which m=2 and the two BHT structures were linked together via a hexylene group, and satisfactory effects were obtained.

In Example 6, a compound (1) was used in which m=1 and $R^3$ was a single bond, and satisfactory effects were obtained.

Based on the results for Examples 7 to 10, it was evident that regardless of the types of colorant, dispersant and solvent that were used, use of the compound (1) enabled satisfactory effects to be obtained.

In Comparative Example 1, no compound (1) was used, and the evaluation result for the ink wettability of the nozzle plate was poor.

In Comparative Example 2, a comparative compound having four BHT structures in which m=4 was used, but the results were poor. The comparative compound of Comparative Example 2 was extremely bulky, and was difficult to dissolve in the non-aqueous solvent.

In Comparative Example 3, a comparative compound was used in which the $R^3$—COO—$R^4$ grouping (ester linkage) in general formula (1) had been replaced with a $R^3$—CONH—$R^4$ grouping (peptide linkage), but the results were poor. It is thought that the comparative compound of Comparative Example 3 exhibited poor affinity with the bonds of the pigment and the dispersant (with the pigment surface having many acidic groups such as COOH, and the dispersant having many basic groups such as $NH_3$), resulting in inferior ink repellency.

In Comparative Example 4, BHT that had not been esterified was used as a comparative compound, but the results were poor. Although the comparative compound of Comparative Example 4 dissolved in the non-aqueous solvent, the affinity with the pigment and the dispersant was poor, and therefore it is thought that the functional groups of the pigment and the dispersant were unable to be inactivated, meaning the ink adhered more readily to the nozzle plate.

In Comparative Examples 5 and 6, comparative compounds were used which, although having benzene rings with introduced t-butyl groups and hydroxyl groups, lacked an ester linkage, and the results were poor.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An oil-based inkjet ink comprising a pigment, a non-aqueous solvent, and a compound represented by general formula (1) shown below:

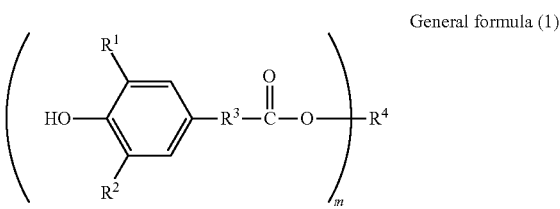

General formula (1)

wherein m represents 1 or 2, each of R1 and R2 independently represents a monovalent saturated hydrocarbon group, R3 represents a single bond or a divalent saturated hydrocarbon group, and R4 represents a monovalent or divalent saturated hydrocarbon group.

2. The oil-based inkjet ink according to claim 1, wherein each of R1 and R2 in general formula (1) independently represents a monovalent saturated hydrocarbon group having a branch.

3. The oil-based inkjet ink according to claim 1, wherein in general formula (1), m represents 1, R3 represents a divalent saturated hydrocarbon group, and R4 represents a monovalent saturated hydrocarbon group.

4. The oil-based inkjet ink according to claim 2, wherein in general formula (1), m represents 1, R3 represents a divalent saturated hydrocarbon group, and R4 represents a monovalent saturated hydrocarbon group.

5. The oil-based inkjet ink according to claim 1, wherein in general formula (1), m represents 1, R1 and R2 are tert-butyl groups, R3 represents a divalent saturated hydrocarbon group, and R4 represents a monovalent saturated hydrocarbon group having at least 6 carbon atoms.

6. The oil-based inkjet ink according to claim 1, wherein in the non-aqueous solvent comprises at least one selected from a group consisting of a petroleum-based hydrocarbon solvent, a fatty acid ester-based solvent having at least 13 carbon atoms, a higher alcohol-based solvents having at least 12 carbon atoms, and a higher fatty acid-based solvent having at least 12 carbon atoms.

7. The oil-based inkjet ink according to claim 1, wherein in general formula (1), R3 represents a single bond.

8. The oil-based inkjet ink according to claim 1, wherein in general formula (1), m represents 2, and R4 represents a divalent saturated hydrocarbon group.

9. The oil-based inkjet ink according to claim 1, wherein in the non-aqueous solvent comprises at least one selected from a group consisting of a petroleum-based hydrocarbon solvent, a fatty acid ester-based solvent having at least 13 carbon atoms, a higher alcohol-based solvents having at least 12 carbon atoms, and a higher fatty acid-based solvent having at least 12 carbon atoms, and in general formula (1), R3 represents a single bond.

10. The oil-based inkjet ink according to claim 1, wherein in the non-aqueous solvent comprises at least one selected from a group consisting of a petroleum-based hydrocarbon solvent, a fatty acid ester-based solvent having at least 13 carbon atoms, a higher alcohol-based solvents having at least 12 carbon atoms, and a higher fatty acid-based solvent having at least 12 carbon atoms, and in general formula (1), m represents 2, and R4 represents a divalent saturated hydrocarbon group.

* * * * *